(12) United States Patent
Suehiro et al.

(10) Patent No.: US 12,026,334 B2
(45) Date of Patent: Jul. 2, 2024

(54) TOUCH PANEL DISPLAY DRIVER AND DISPLAY MODULE

(71) Applicant: Sharp Display Technology Corporation, Kameyama (JP)

(72) Inventors: Daisuke Suehiro, Kameyama (JP);
Daiji Kitagawa, Kameyama (JP);
Noriyuki Tanaka, Kameyama (JP);
Tatsuhiko Suyama, Kameyama (JP);
Jin Miyazawa, Kameyama (JP);
Yousuke Nakamura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/135,041

(22) Filed: Apr. 14, 2023

(65) Prior Publication Data

US 2023/0333679 A1 Oct. 19, 2023

(30) Foreign Application Priority Data

Apr. 19, 2022 (JP) .................. 2022-069120

(51) Int. Cl.
*G06F 3/041* (2006.01)
*G09G 3/36* (2006.01)
(52) U.S. Cl.
CPC ........ *G06F 3/0412* (2013.01); *G06F 3/04164* (2019.05); *G09G 3/3655* (2013.01)

(58) Field of Classification Search
CPC . G06F 3/0412; G06F 3/04164; G06F 3/04166
See application file for complete search history.

(56) References Cited

U.S. PATENT DOCUMENTS

| | | | |
|---|---|---|---|
| 2011/0037745 A1* | 2/2011 | Takasugi ........ | H03K 19/018521 327/333 |
| 2012/0169704 A1* | 7/2012 | Chung ................. | G09G 3/3233 345/212 |
| 2018/0107317 A1 | 4/2018 | Tanaka et al. | |
| 2020/0019031 A1 | 1/2020 | Koide et al. | |
| 2023/0333679 A1* | 10/2023 | Suehiro ............... | G06F 3/04164 |

FOREIGN PATENT DOCUMENTS

| JP | 2018-063666 A | 4/2018 |
|---|---|---|
| JP | 2020-012869 A | 1/2020 |

* cited by examiner

*Primary Examiner* — Van N Chow
(74) *Attorney, Agent, or Firm* — ScienBiziP, P.C.

(57) ABSTRACT

A touch panel display driver includes a source driver circuit, a touch detection circuit, a selector circuit, a register a plurality of source terminals, a plurality of touch detection terminals, and a plurality of selection terminals. The selector circuit electrically connects the source driver circuit to each of the source terminals, electrically connects the touch detection circuit to each of the touch detection terminals, and electrically connects each of the selection terminals to the source driver circuit or the touch detection circuit.

8 Claims, 11 Drawing Sheets

TOUCH PANEL DISPLAY DRIVER AND DISPLAY MODULE

CROSS-REFERENCE TO RELATED APPLICATIONS

This application claims the benefit of priority to Japanese Patent Application Number 2022-069120 filed on Apr. 19, 2022. The entire contents of the above-identified application are hereby incorporated by reference.

BACKGROUND

Technical Field

The disclosure relates to a touch panel display driver and a display module.

A display device with a built-in touch panel is advantageous in that, for example, light transmittance can be increased, a thickness of the display device can be reduced, and frame narrowing can be realized, and is used for a display device of a mobile terminal such as a smartphone, a laptop computer, or a tablet.

In the display device with the built-in touch panel, an electrode of the touch panel is provided in the display panel, or a part of a configuration of the display panel also serves as the electrode of the touch panel. Thus, when a driver of the display panel is integrated with a driver and/or a detection circuit of the touch panel, a mounting area of the driver can be reduced, which is advantageous from the viewpoint of frame narrowing. JP 2018-63666 A discloses such a display driver.

SUMMARY

An object of the disclosure is to provide a touch panel display driver including at least some drivers of a display panel, and at least some drivers of a touch panel and a display module.

A touch panel display driver according to an embodiment of the disclosure includes a source driver circuit, a touch detection circuit, a selector circuit, a register, a plurality of source terminals, a plurality of touch detection terminals, and a plurality of selection terminals, in which the selector circuit includes a plurality of first switching elements and a plurality of second switching elements, electrically connects the source driver circuit to each of the plurality of source terminals, and electrically connects the touch detection circuit to each of the plurality of touch detection terminals, in the selector circuit, each of the plurality of first switching elements and a respective one of the plurality of second switching elements constitute a pair, and in each pair, one end of the first switching element and one end of the second switching element are electrically connected to a same one of the plurality of selection terminals, an other end of the first switching element is electrically connected to the source driver circuit, and an other end of the second switching element is electrically connected to the touch detection circuit, and the selector circuit is configured to selectively turn on one from among the first switching element and the second switching element in each of the plurality of pairs at a time of operation based on setting data of a register set by a signal received from outside.

According to one embodiment of the disclosure, a touch panel display driver including at least some drivers of a display panel, and at least some drivers of a touch panel and a display module, is provided.

BRIEF DESCRIPTION OF DRAWINGS

The disclosure will be described with reference to the accompanying drawings, wherein like numbers reference like elements.

DESCRIPTION OF EMBODIMENTS

Figure 1:
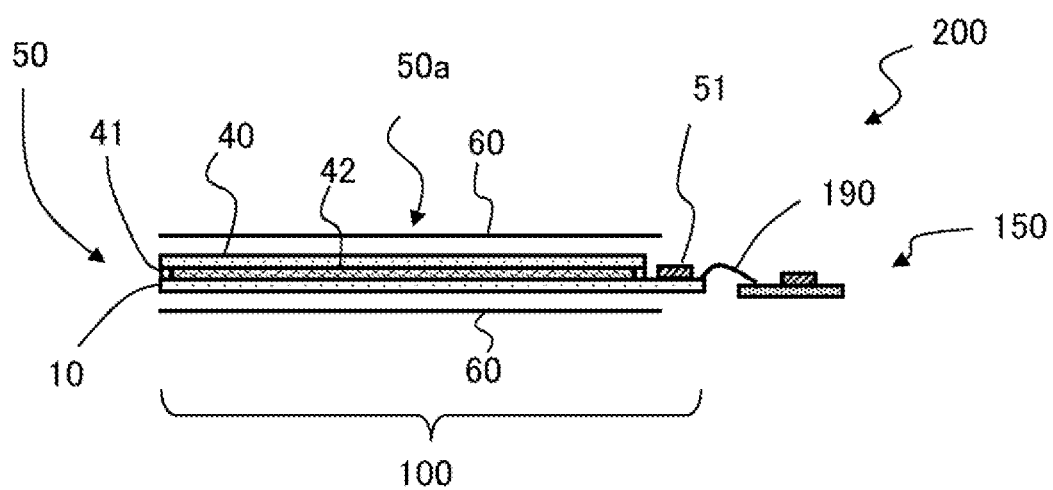
FIG. 1 is a schematic cross-sectional view illustrating a configuration example of a display device according to a first embodiment.

In a display device with a built-in touch panel, a driver for a source wiring line (data wiring line) of a display panel and a driver of a touch panel are generally disposed on the same side of a display panel having a rectangular shape. Thus, as described in JP 2018-63666 A, these two drivers can be integrated into one IC chip. However, since the number of source wiring lines to be driven and the number of touch detection wiring lines are determined in these drivers, when the drivers are integrated, the maximum number of source wiring lines and the maximum number of touch detection wiring lines that can be driven by the one IC chip are also determined.

Thus, in the display device with the built-in touch panel, it is difficult to independently change an image resolution and a touch detection resolution.

Increasing the number of ICs used increases the total number of source wiring lines that can be driven, but also increases the total number of touch detection wiring lines by the same rate. This means that when a plurality of the ICs are used, unused terminals for connecting to the source wiring lines or the touch detection wiring lines are generated.

Since frame narrowing is required for the display device, mounting the ICs including the unused terminals on a substrate of the display device is disadvantageous from the viewpoint of frame narrowing.

In view of such a problem, the inventor of the present application has conceived a novel touch panel display driver and a novel display module.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 is a schematic cross-sectional view illustrating a configuration example of a display device 200 according to the present embodiment. The display device 200 includes a display module 100 and a control board 150. The display module 100 includes a display panel 50 including an active matrix substrate 10, and a touch panel display driver 51. In the example illustrated in FIG. 1 and below, the display panel 50 is a liquid crystal display device. However, as long as the display device, the display module, and the display panel according to the present embodiment are a display device or the like using an active matrix substrate, they are not limited to the liquid crystal display device and may be an organic EL display device or the like.

The display panel 50 is an in-cell touch panel type display panel, and can detect a position at which a display surface 50a of the display panel 50 is indicated by a pointer, such as a finger or a touch pen, in the display panel 50.

The display panel 50 illustrated in FIG. 1 includes the active matrix substrate 10, a counter substrate 40, and a liquid crystal layer 42. The counter substrate 40 is disposed with a predetermined gap from a main surface of the active matrix substrate 10 by a spacer 41, and the liquid crystal layer 42 is sandwiched between the active matrix substrate 10 and the counter substrate 40. The display module 100 further includes a pair of polarizers 60. The pair of polarizers 60 are disposed in a crossed-Nicol state with the display panel 50 interposed therebetween.

The touch panel display driver 51 is mounted on the active matrix substrate 10 of the display module 100. The display module 100 and the control board 150 are electrically connected to each other by, for example, a flexible substrate (flexible printed circuit, FPC) 190.

Figure 2:
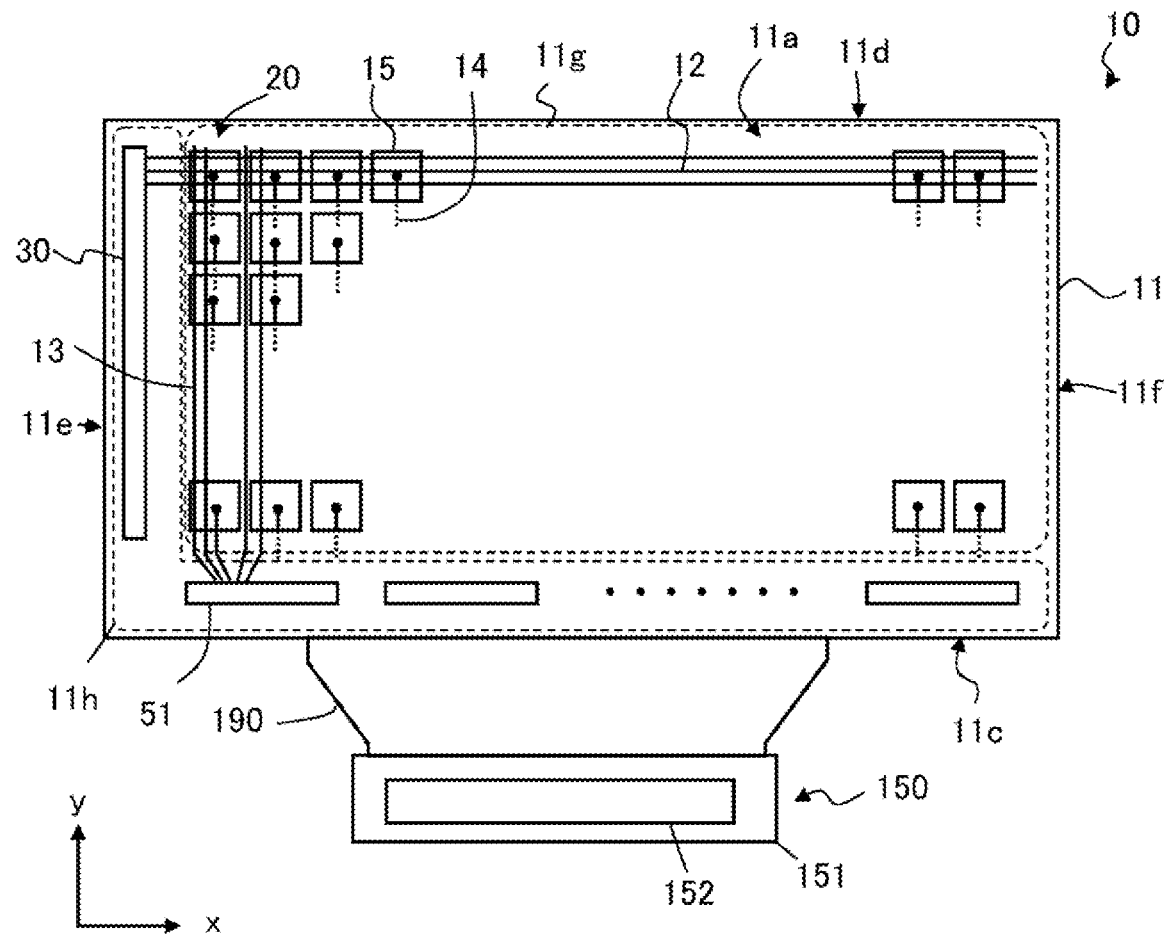
FIG. 2 is a schematic view illustrating a configuration of an active matrix substrate of the display device illustrated in FIG. 1.

FIG. 2 is a schematic view illustrating a configuration of the active matrix substrate 10. FIG. 2 also illustrates the control board 150 and the flexible substrate (FPC) 190.

The active matrix substrate 10 includes a substrate 11, a plurality of source wiring lines 13, a plurality of gate wiring lines 12, a plurality of sensor electrodes 15, a plurality of touch detection wiring lines 14, and a plurality of pixels 20.

The substrate 11 has a plate shape including a main surface 11a and a first side 11c. In the present embodiment, the substrate 11 has a rectangular shape and includes the first side 11c, a second side 11d, a third side 11e, and a fourth side 11f. The main surface 11a includes a display region 11g and a non-display region 11h that is a region other than the display region 11g. The non-display region 11h is a region that does not contribute to display, and is provided, for example, along the first side 11c and the third side 11e of the substrate 11.

The plurality of pixels 20 are two dimensionally disposed in a matrix shape in an x direction and a y direction in the display region 11g of the substrate 11. The plurality of source wiring lines 13 extend in the y direction and are arranged in the x direction. The plurality of gate wiring lines 12 extend in the x direction and are arranged in the y direction.

Figure 3:
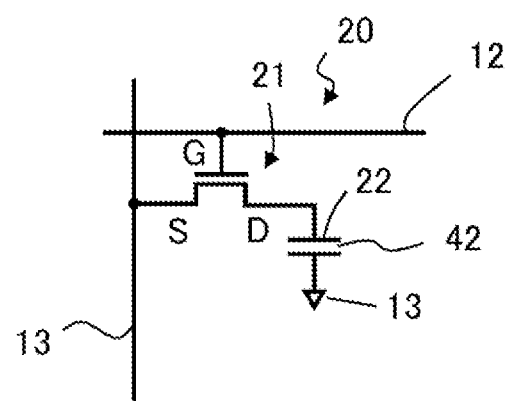
FIG. 3 is a circuit diagram illustrating a configuration example of each pixel of the display device illustrated in FIG. 1.

FIG. 3 is a circuit diagram illustrating a configuration example of each pixel 20. The pixel 20 includes a TFT21 serving as a switching element and a pixel electrode 22. The TFT21 of each pixel 20 is disposed near a position where the source wiring line 13 and the gate wiring line 12 intersect each other, and a gate electrode G of the TFT21 is electrically connected to the gate wiring line 12. A source electrode S of the TFT21 is electrically connected to the source wiring line 13. A drain electrode D of the TFT21 is connected to the pixel electrode 22.

As illustrated in FIG. 2, the plurality of sensor electrodes 15 are also two dimensionally disposed in the matrix shape in the x direction and the y direction in the display region 11g. In general, a resolution for detecting a touch position for a touch panel may be lower than a resolution of an image displayed by the display device 200. Thus, an arrangement pitch of the sensor electrodes 15 may be larger than an arrangement pitch of the pixels 20.

Each of the touch detection wiring lines 14 is electrically connected to a respective one of the sensor electrodes 15. The touch detection wiring lines 14 extend in the y direction and are arranged in the x direction. In the present embodiment, the sensor electrode 15 also serves as the counter electrode in the display panel 50. As illustrated in FIG. 3, in each pixel 20, the liquid crystal layer 42 located between the pixel electrode 22 and the sensor electrode 15 functions as a holding capacitor.

As described above, the display panel 50 is an in-cell type touch panel, but the structure of the touch panel is not limited to this example, and in-cell type touch panels of various structures may be used. For example, a drive electrode and a sensor electrode that function as the touch panel may be provided separately from the structure of the display panel, or an electrode of a liquid crystal display panel in a transverse electrical field mode may also serve as the sensor electrode. Further, the touch panel may be a self-capacitance type and may be a mutual-capacitance type.

In the present embodiment, the display module 100 further includes a gate driver 30. The gate driver 30 is disposed in the non-display region 11h adjacent to the third side 11e in the active matrix substrate 10, and is connected to one end of the gate wiring line 12. The touch panel display driver 51 is disposed in the non-display region 11h adjacent to the first side 11c in the active matrix substrate 10, and is connected to one end of the source wiring line 13 and one end of the touch detection wiring line 14 near the first side 11c.

Although the gate driver 30 is illustrated as one IC package or chip in FIG. 2, the gate driver 30 may be constituted by a plurality of IC packages. The gate driver 30 may be configured by TFTs or the like in the non-display region 11h of the substrate 11, and may be formed integrally with the active matrix substrate 10. The touch panel display driver 51 is configured as one or more IC packages or chips. Preferably, the touch panel display driver 51 is a member different from the active matrix substrate 10, and is mounted in the non-display region 11h of the substrate 11.

The control board 150 includes a substrate 151 and a display controller 152. As described above, the display module 100 and the display controller 152 are electrically connected to each other by the flexible substrate 190. Note that the touch panel display driver 51 may be mounted on the flexible substrate 190.

Figure 4:
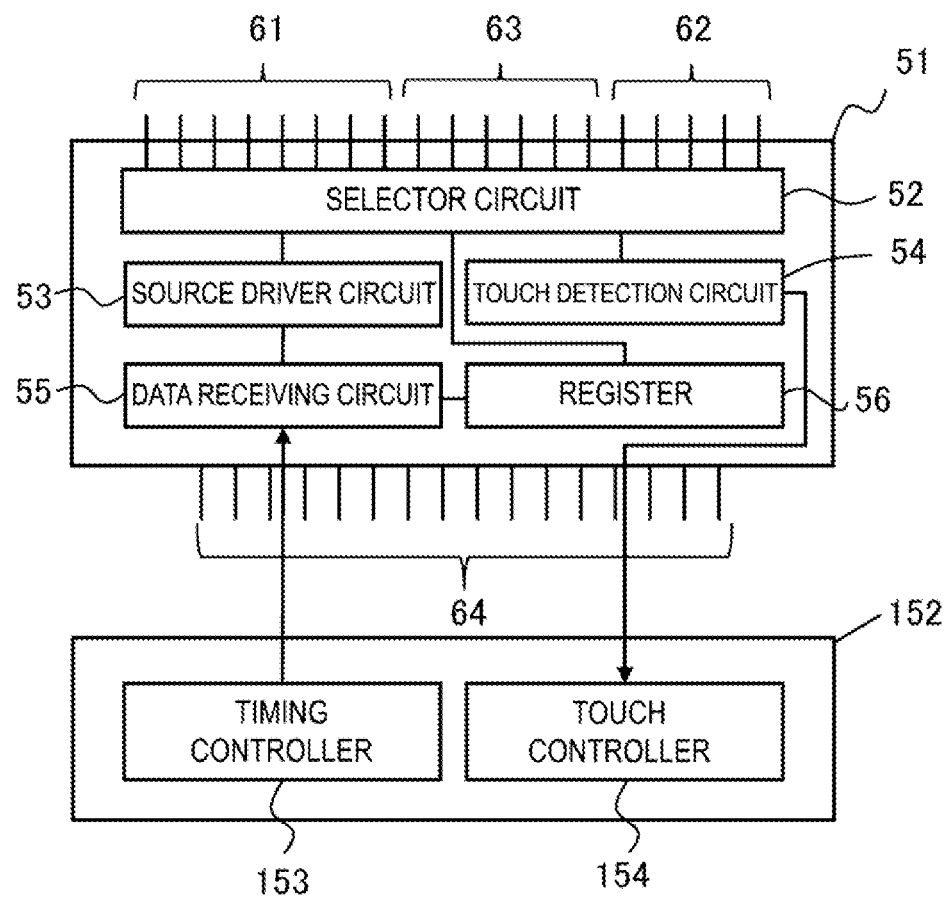
FIG. 4 is a block diagram illustrating a configuration example of a touch panel display driver and a display controller.
Figure 5A:
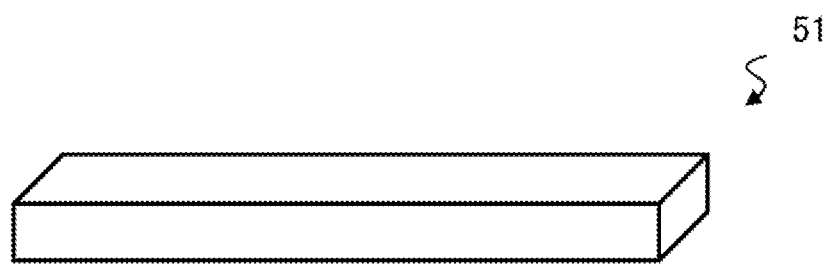
FIG. 5A is a perspective view illustrating an appearance of the touch panel display driver.
Figure 5B:
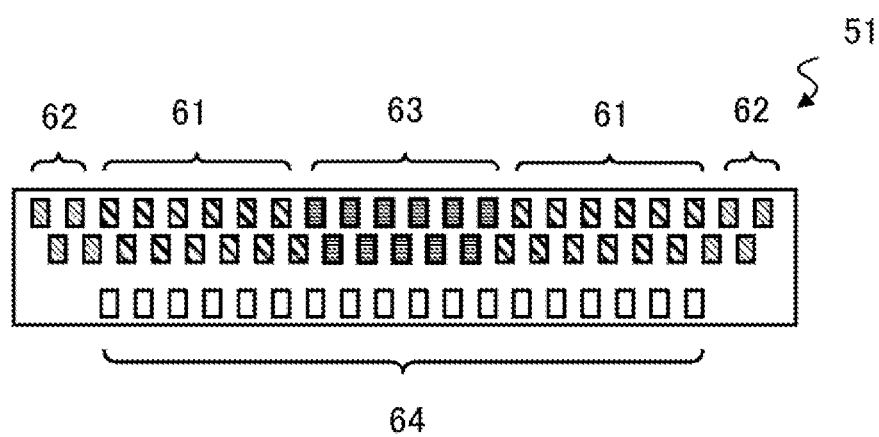
FIG. 5B is a bottom view illustrating an appearance of the touch panel display driver.

FIG. 4 is a block diagram illustrating an example of a configuration of the touch panel display driver 51 and the display controller 152. FIG. 5A and FIG. 5B are a perspective view illustrating an appearance and a bottom view, respectively, of the touch panel display driver 51. The touch panel display driver 51 includes a plurality of source terminals 61, a plurality of touch detection terminals 62, a plurality of selection terminals 63, a selector circuit 52, a source driver circuit 53, a touch detection circuit 54, a data receiving circuit 55, and a register 56. Further, the display controller 152 includes a timing controller 153 and a touch controller 154.

The display controller 152 receives image data from a host computer or the like that controls the display device 200, and the timing controller 153 outputs the image data to the touch panel display driver 51. As will be described later, the timing controller 153 also outputs setting data of the selector circuit 52 at the time of activation. The timing controller 153 may further output a gate control signal to the gate driver 30. The touch controller 154 receives, from the touch panel display driver 51, touch data of having detected a touch of the pointer in the display surface 50a (FIG. 1), and generates touch position information.

As illustrated in FIG. 5A and FIG. 5B, the touch panel display driver 51 has an outer shape covered with a resin package having the shape of a substantially rectangular parallelepiped, for example, and the plurality of source terminals 61, the plurality of touch detection terminals 62, and the plurality of selection terminals 63 are disposed on a bottom face of the rectangular parallelepiped. The touch panel display driver 51 further includes a plurality of fourth terminals 64. In the example illustrated in FIG. 5A and FIG. 5B, these terminals have a flat pad shape disposed on the bottom face, but these terminals may have a pin shape extending from the bottom face or a pin shape extending from a side surface of the rectangular parallelepiped. The touch panel display driver 51 needs not be covered with the resin package and may be a bare chip. A position, a size, and number of each terminal illustrated in the FIG. 5B are schematically illustrated for ease of understanding, and are different from the position, size, and number of each terminal in the actual touch panel display driver 51. In particular, the number of terminals illustrated is much smaller than the number of terminals of the actual touch panel display driver 51 for the sake of simplicity.

The touch panel display driver 51 is mounted on the active matrix substrate 10, and thus each of the source terminals 61, the touch detection terminals 62, and the selection terminals 63 are electrically connected to a respective one of the source wiring lines 13 or the touch detection wiring lines 14 of the active matrix substrate 10, and the fourth terminals are electrically connected to the display controller 152 via the flexible substrate (FPC) 190. More specifically, each of the source terminals 61 is electrically connected to a respective one of the source wiring lines 13, and each of the touch detection terminals 62 is electrically connected to a respective one of the touch detection wiring lines 14. On the other hand, all of the selection terminals 63 are each electrically connected to a respective one of the source wiring lines 13, all of the selection terminals 63 are each electrically connected to a respective one of the touch detection wiring lines 14, or some of the selection terminals 63 are each electrically connected to a respective one of the source wiring lines 13 and at least some of the remaining selection terminals 63 are each electrically connected to a respective one of the touch detection wiring lines 14. That is, some of the selection terminals 63 need not be electrically connected to any of the source wiring lines 13 and the touch detection wiring lines 14.

On the other hand, in the touch panel display driver 51, the source terminals 61, the touch detection terminal 62, and the selection terminal 63 are electrically connected to the selector circuit 52, and the fourth terminals 64 are electrically connected to the touch detection circuit 54 and the data receiving circuit 55.

Figure 6:
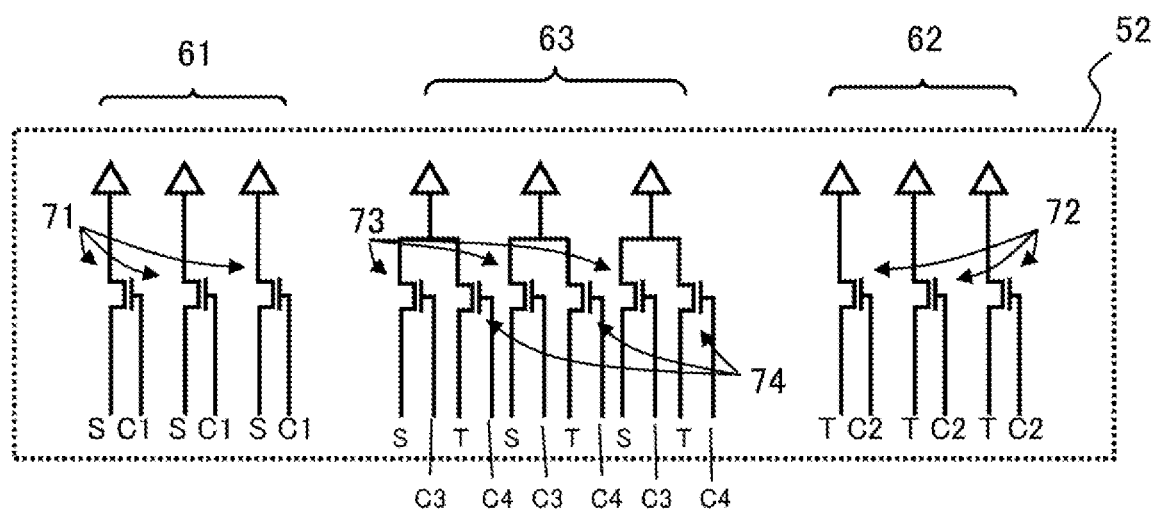
FIG. 6 is a circuit diagram illustrating a configuration example of a selector circuit.

FIG. 6 is a circuit diagram illustrating an example of a configuration of the selector circuit 52. The selector circuit 52 includes a plurality of third switching elements 71, a plurality of fourth switching elements 72, a plurality of first switching elements 73, and a plurality of second switching elements 74. Each switching element is a switching element whose switch is turned on by having a voltage applied to a control terminal, and is, for example, a transistor such as an FET. In this case, the control terminal is a gate.

Each of the third switching elements 71 includes one end connected to a respective one of the source terminals 61 and another end connected to the source driver circuit 53. In FIG. 6, each connection to the source driver circuit 53 is indicated by "S". That is, each of the third switching elements 71 is connected between a respective one of the source terminals 61 and the source driver circuit 53. Similarly, each of the fourth switching elements 72 includes one end connected to a respective one of the touch detection terminals 62 and another end connected to the touch detection circuit 54. In FIG. 6, each connection to the touch detection circuit 54 is indicated by "T".

Each of the first switching elements 73 and a respective one of the second switching elements 74 form a pair. In each pair, one end of the first switching element 73 and one end of the second switching element 74 are electrically connected to the same one of the plurality of selection terminals 63. The other end of the first switching element 73 is electrically connected to the source driver circuit 53(S), and the other end of the second switching element 74 is electrically connected to the touch detection circuit 54(T).

Connection wiring lines to gates that are control terminals of the third switching element 71, the fourth switching element 72, the first switching element 73, and the second switching element 74 are denoted by C1, C2, C3, and C4, respectively.

During operation of the touch panel display driver 51, the selector circuit 52 selectively turns on one from among the first switching element 73 and the second switching element 74 by applying a voltage to one of the wiring line C3 and the wiring line C4 in each pair consisting of the first switching element 73 and the second switching element 74 based on setting data of the register 56. During the operation, a voltage is applied to the wiring line C1 and the wiring line C2, and thus the third switching element 71 and the fourth switching element 72, respectively, are turned on. As a result, the source terminals 61 are connected to the source driver circuit 53, and the touch detection terminals 62 are connected to the touch detection circuit 54.

The selector circuit 52 needs not include the third switching elements 71 and the fourth switching elements 72. In this case, regardless of the operation state, the source terminals 61 and the source driver circuit 53 are always connected to each other, and the touch detection terminals 62 and the touch detection circuit 54 are always connected to each other. When the plurality of third switching elements 71 and the plurality of fourth switching elements 72 are not provided, a circuit scale of the selector circuit 52 can be reduced, and a defect rate at a time of manufacturing can also be reduced. On the other hand, in a case where the selector circuit 52 includes the plurality of third switching elements 71 and the plurality of fourth switching elements 72, a difference in voltage level between the source terminal 61 and the selection terminal 63 connected to the source driver circuit 53 and between the touch detection terminal 62 and the selection terminal 63 connected to the touch detection circuit 54 can be suppressed, as compared with a case where the switching element is interposed only between the selection terminal 63 and the source driver circuit 53 and the touch detection circuit 54.

The data receiving circuit 55 receives setting data and image data from the display controller 152, outputs the setting data to the register 56, and outputs the image data to the source driver circuit 53.

The source driver circuit 53 receives the image data from the data receiving circuit 55, and generates a source signal to be supplied to the source wiring line 13 connected to the pixel 20 of the active matrix substrate 10. The number of source signals that can be generated, that is, the number of source wiring lines 13 that can be driven, is equal to the sum of the number of source terminals 61 and the number of selection terminals 63. As described above, the source driver circuit 53 is connected to the third switching elements 71 and the first switching elements 73 of the selector circuit 52.

The register 56 stores the setting data received from the data receiving circuit 55 as a register value. The setting data indicates which of the first switching element 73 and the second switching element 74 is to be turned on in a plurality of the pairs respectively consisting of the first switching element 73 and the second switching element 74. The selector circuit 52, during operation, turns on one of the first switching element 73 or the second switching element 74 and turns off the other by applying a voltage to one of the wiring line C3 and the wiring line C4 in each pair consisting of the first switching element 73 and the second switching element 74 based on the setting data. With whichever register value is set, a voltage is applied to the wiring line C1 and the wiring line C2 that control the third switching elements 71 and the fourth switching elements 72, respectively, and all of the third switching elements 71 and the fourth switching elements 72 are turned on.

The setting data may include a plurality of setting values. Table 1 shows an example of the number of third switching elements 71, fourth switching elements 72, first switching elements 73, and second switching elements 74 that are turned on in a case where the setting value (register value) set in the register is from 0 to 7 (3 bits). The setting values, that is, the register values, are different from each other, and thus corresponding to the values, the numbers of the first switching elements 73 to be turned on are different from each other. For example, in the example shown in Table 1, in a case where the value of the register is "0", 288 first switching elements 73 are turned on, and in a case where the value of the register is "1", 240 first switching elements 73 are turned on. Note that each of the first switching elements 73 and a respective one of the second switching elements 74 form the pair, and thus the number of first switching elements 73 that are turned on coincides with the number of second switching elements 74 that are turned off.

TABLE 1

| Register value | Number of third switching elements 71 to be turned on | Number of fourth switching elements 72 to be turned on | Number of first switching elements 73 to be turned on | Number of second switching elements 74 to be turned on | Number of terminals connectable to source wiring lines 13 | Number of terminals connectable to touch detection wiring lines 14 |
|---|---|---|---|---|---|---|
| 0 | 912 | 528 | 288 | 0 | 1440 | 528 |
| 1 | 912 | 528 | 240 | 48 | 1392 | 576 |
| 2 | 912 | 528 | 192 | 96 | 1344 | 624 |
| 3 | 912 | 528 | 144 | 144 | 1296 | 672 |
| 4 | 912 | 528 | 96 | 192 | 1248 | 720 |
| 5 | 912 | 528 | 48 | 240 | 1200 | 768 |
| 6 | 912 | 528 | 0 | 288 | 1152 | 816 |
| 7 | | | None (reserve) | | | |

Figure 7A:
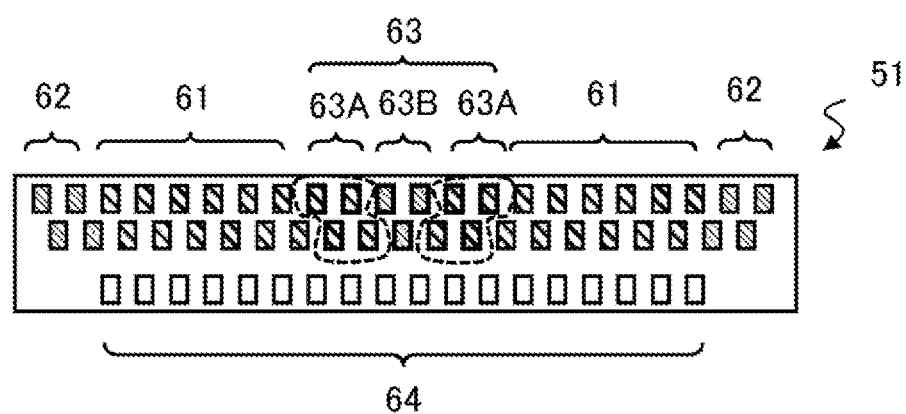
FIG. 7A is a schematic view illustrating a connection example of selection terminals of the touch panel display driver.
Figure 7B:
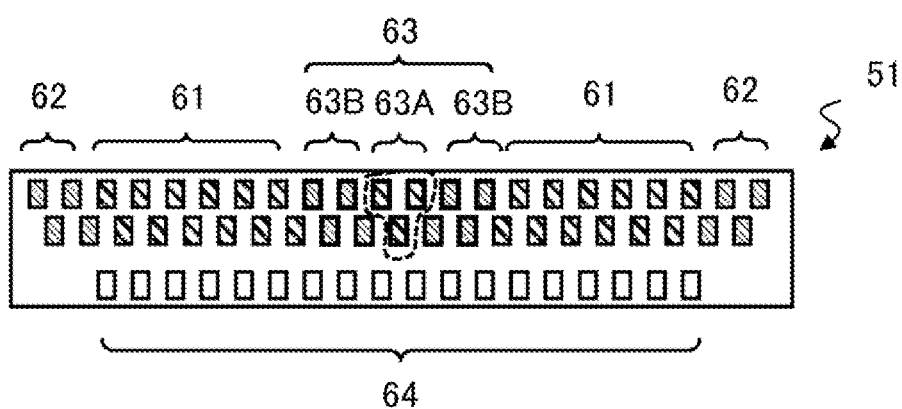
FIG. 7B is a schematic view illustrating a connection example of the selection terminals of the touch panel display driver.

The setting data includes information of which first switching element 73 is to be turned on. FIG. 7A and FIG. 7B schematically illustrate which of the source driver circuit 53 and the touch detection circuit 54 the selection terminals 63 are connected to in a case where the first switching elements 73 or the second switching elements 74 are selectively turned on in accordance with the setting value of the register 56. In FIG. 7A and FIG. 7B, the positions of the selection terminals 63A connected to the source driver circuit 53 and the selection terminals 63B connected to the touch detection circuit 54 are different from each other. In FIG. 7A, of the selection terminals 63, eight terminals on both sides (four terminals on each side) surrounded by broken lines are the selection terminals 63A connected to the source driver circuit 53, and three terminals in the center are the selection terminals 63B connected to the touch detection circuit 54. On the other hand, in FIG. 7B, of the selection terminals 63, eight terminals on both sides (four terminals on each side) are the selection terminals 63B connected to the touch detection circuit 54, and three terminals in the center surrounded by a broken line are the selection terminals 63A connected to the source driver circuit 53. As described above, the positions of the selection terminals each connected to a respective one of the first switching elements to be turned on are different from each other correspondent to each of the plurality of setting values.

Note that in the example shown in Table 1, the numbers of the first switching elements 73 to be turned on for different values of the register 56 are different from each other. In this case, the positions of at least some of the first switching elements 73 to be turned on for the different register values may be different from each other. That is, of the plurality of selection terminals 63, the numbers and positions of the selection terminals connected to the source driver circuit 53 may be different from each other. However, the numbers of the first switching elements 73 to be turned on for different register values may be the same, and only the positions of the first switching elements 73 to be turned on, that is, only the positions of the selection terminals connected to the source driver circuit 53, may be different from each other.

The source wiring lines 13 and the touch detection wiring lines 14 extend in the same direction and are drawn out to a non-display region 11h, and thus one end of the source wiring line 13 and one end of the touch detection wiring line 14 connected to the source terminal 61, the touch detection terminal 62, and the selection terminal 63 of the touch panel display driver 51 are arranged in a predetermined order in the non-display region 11h. When the image resolution and the touch detection resolution are changed, the number of source wiring lines 13 and the number of touch detection wiring lines are also changed, and thus the order of arrangement may also be changed. Thus, the number and positions of the selection terminals 63 connected to the source driver circuit 53, or only the positions of the selection terminals 63 can be changed, and thus the degree of freedom in designing a circuit pattern including the source wiring lines 13 and the touch detection wiring lines 14 in the active matrix substrate 10 can be increased.

The touch detection circuit 54 includes an analog front end (AFE) and detects electrostatic capacitance of each of the sensor electrodes 15 via a respective one of the touch detection wiring lines 14 of the active matrix substrate 10. The number of sensor electrodes 15 that can be detected, that is, the number of touch detection wiring lines 14, is equal to the sum of the number of touch detection terminals 62 and the number of selection terminals 63. As described above, the touch detection circuit 54 is connected to the fourth switching elements 72 and the first switching elements 73 of the selector circuit 52.

Next, operations of the touch panel display driver 51 and the display controller 152 will be described.

First, when the touch panel display driver 51 is mounted on the active matrix substrate 10, of the plurality of selection terminals 63, each of terminals electrically connected to a respective one of the source wiring lines 13 and each of the terminals connected to a respective one of the touch detection wiring lines 14 are determined.

When the display device 200 operates, the display controller 152 receives image data from the host computer or the like, and the timing controller 153 outputs the setting data of the register and the image data to the touch panel display driver 51. The touch panel display driver 51 receives these data by the data receiving circuit 55 and stores the setting data in the register 56. As described above, the selector circuit 52 selectively turns on one from among the first switching element and the second switching element connected to the selection terminal 63 based on the setting data of the register 56, and connects the selection terminal 63 to the source driver circuit 53 or the touch detection circuit 54. As described above, each of the source wiring lines 13 is connected to a respective one of the selection terminals 63 connected to the source driver circuit 53, and each of the touch detection wiring lines 14 is connected to a respective one of the selection terminals 63 connected to the touch detection circuit 54.

The source driver circuit 53 of the touch panel display driver 51 supplies image data to the source wiring lines 13 of the active matrix substrate 10 via the selector circuit 52.

Each of the touch detection wiring lines 14 connected to a respective one of the sensor electrodes 15 is connected to the touch detection circuit 54 via the selector circuit 52, and a voltage based on the electrostatic capacitance of the sensor electrodes 15 is detected by the touch detection circuit 54. The detected voltage is input to the touch controller 154 of the display controller 152 as the touch data to generate touch position information.

According to the touch panel display driver 51 of the present embodiment, the selection terminal 63 can be used not only for driving the source wiring line but also for detecting the electrostatic capacitance of the sensor electrode. For this reason, the present embodiment can cope with various image resolutions and touch detection resolutions. Hereinafter, effects of the touch panel display driver 51 according to the present embodiment will be described in comparison with a known touch panel display driver.

In the known touch panel display driver, the number of source wiring lines that can be driven and the number of touch detection wiring lines that can be detected by one touch panel display driver are determined in advance and cannot be changed. For example, as shown in Table 2, the number of source wiring lines that can be driven by a certain known touch panel display driver is 1440, and the number of touch detection wiring lines being the number of sensor electrodes that can be detected is 528. On the other hand, in the touch panel display driver 51 of the present embodiment, the selection terminal can be connected to the source wiring line or the touch detection wiring line in accordance with the value of the register. That is, a ratio between the terminals for the source wiring lines and the terminals for the touch detection wiring lines in the selection terminals can be changed. For example, when the use of the selection terminal 63 can be changed as shown in Table 1, the number of source wiring lines that can be driven is from 1152 to 1440, and the number of touch detection wiring lines that can be detected is from 528 to 816.

TABLE 2

|  | Known Example | Embodiment (Table 1) |
|---|---|---|
| Number of source wiring lines that can be driven | 1440 | 1152 to 1440 |
| Number of touch detection wiring lines that can be detected | 528 | 528 to 816 |

In this case, for example, the number of touch panel display drivers required to drive an in-cell touch panel type display panel having the image resolution and the touch resolution shown in Table 3 is four (1440×4=5760) based on the number of source wiring lines and four (528×4=2112) based on the number of touch detection wiring lines. Also in the present embodiment, when the value of the register is set to "0", the number of source wiring lines that can be driven and the number of touch detection wiring lines that can be detected are the same as those in the known example, and the number of drivers required is also the same.

TABLE 3

| Setting conditions | Number of drivers required | |
|---|---|---|
| Image resolution: FHD<br>Panel size: 13.3 inches<br>(293.8 × 174.0) Sensor pitch: 5 mm | Known Example | Embodiment (Register value: 0) |
| Total number of source wiring lines: 5760 | 4 | 4 |
| Total number of touch detection wiring lines: 2065 | 4 | 4 |

On the other hand, as shown in Table 4, in a case where the touch resolution is increased, even when the image resolution is also FHD, in the known example, the number of touch panel display drivers required to drive the in-cell touch panel type display panel is four (1440×4=5760) based on the number of source wiring lines and seven (528×7=3696) based on the number of touch detection wiring lines. That is, since only the number of touch detection wiring lines to be detected increases, in a case where four touch panel display drivers are mounted, touch detection wiring lines that cannot be detected are generated. In order to detect all the touch detection wiring lines, seven touch panel display drivers are required.

At this time, in the three touch panel display drivers to be added, no source wiring line is connected to the terminals to be connected to the source wiring lines. That is, the terminals to be connected to the source wiring lines are left unused. On the other hand, the three touch panel display drivers are required to be mounted in the non-display region of the active matrix substrate, and thus a wide non-display region is required to be secured. Alternatively, when the non-display region is limited and further mounting of the three touch panel display drivers is difficult, in the known touch panel display driver, driving the display panel shown in Table 4 is difficult.

On the other hand, in a case where the touch panel display driver of the present embodiment is used, the value of the register is set to "4", and thus the number of touch panel display drivers required to drive the in-cell touch panel type display panel is five (1248×5=6240) based on the number of source wiring lines and five (720×5=3600) based on the number of touch detection wiring lines. Thus, five touch panel display drivers according to the present embodiment are mounted on the active matrix substrate 10, and thus the display panel having the high touch resolution under the conditions shown in Table 4 can be driven. Compared with the case of using known touch panel display drivers, the number of touch panel display drivers can be reduced by two. Thus, according to the display module of the present embodiment, even in the in-cell touch panel having higher detection resolution, an increase in the area of the non-display region can be suppressed.

TABLE 4

| Setting conditions | Number of drivers required | |
|---|---|---|
| Image resolution: FHD<br>Panel size: 13.3 inches<br>(293.8 × 174.0) Sensor pitch: 4 mm | Known Example | Embodiment (Register value: 4) |
| Total number of source wiring lines: 5760 | 4 | 5 |
| Total number of touch detection wiring lines: 3256 | 7 | 5 |

Table 5 shows an example of a touch panel display driver required to drive an in-cell touch panel type display panel in which the image resolution is UHD, and the touch resolution is higher (the pitch of the sensor electrodes is 3 mm). In the known example, the number of touch panel display drivers required to drive the in-cell touch panel type display panel is eight (1440×8=11520) based on the number of source wiring lines and eleven (528×11=58086) based on the number of touch detection wiring lines. Thus, 11 known touch panel display drivers are required to drive the display panel under the conditions in Table 5.

On the other hand, in a case where the touch panel display driver of the present embodiment is used, the value of the register is set to "3", and thus the number of touch panel display drivers required to drive the in-cell touch panel type display panel is nine (1296×9=11664) based on the number of source wiring lines and nine (672×9=6048) based on the number of touch detection wiring lines. Thus, nine touch panel display drivers according to the present embodiment are mounted on the active matrix substrate 10, and thus the display panel having the high image resolution and touch resolution under the conditions shown in Table 5 can be driven.

TABLE 5

| Setting conditions | Number of drivers required | |
|---|---|---|
| Image resolution: UHD<br>Panel size: 13.3 inches<br>(293.8 × 174.0) Sensor pitch: 3 mm | Known Example | Embodiment (Register value: 3) |
| Total number of source wiring lines: 11520 | 8 | 9 |
| Total number of touch detection wiring lines: 5684 | 11 | 9 |

As described above, it can be seen that the touch panel display driver according to the present embodiment can be adapted to the in-cell touch panels corresponding to various image resolutions and touch resolutions, and can drive the in-cell touch panel type display panel with a smaller number of touch panel display drivers.

Second Embodiment

Figure 8:
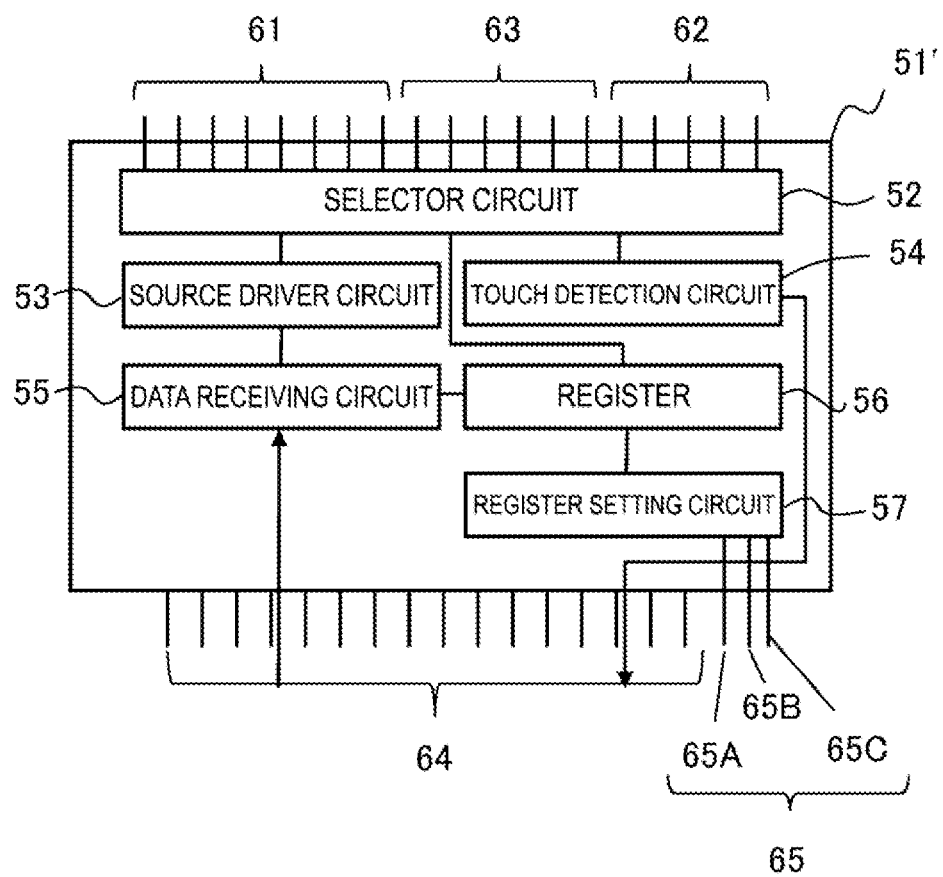
FIG. 8 is a block diagram illustrating a configuration example of a touch panel display driver according to a second embodiment.
Figure 9:
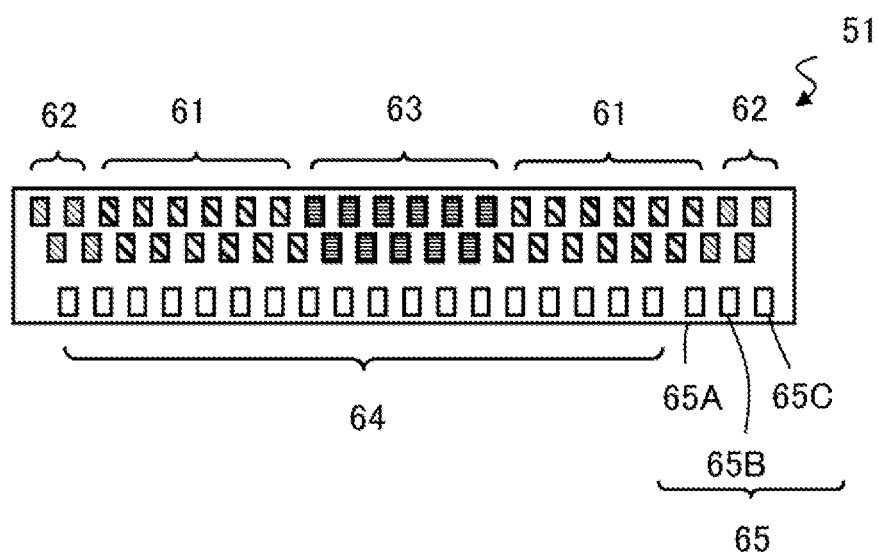
FIG. 9 is a bottom view illustrating an appearance of the touch panel display driver illustrated in FIG. 8.

FIG. 8 is an example of a block diagram of a touch panel display driver 51' according to the present embodiment, and FIG. 9 is a schematic view illustrating terminals on the bottom face of the touch panel display driver according to the present embodiment. The touch panel display driver 51' of the present embodiment further includes at least one setting terminal 65 and a register setting circuit 57. For example, the touch panel display driver 51' includes three setting terminals 65A, 65B, and 65C. For example, a high-level (H) or a low-level (L) voltage is applied to the setting terminals 65A, 65B, and 65C, and the register setting circuit 57 sets the setting data into the register based on a combination of the setting terminals 65A, 65B, and 65C and the applied voltage.

Based on the setting data set to the register 56, as described in the first embodiment, the selector circuit 52 turns on the third switching elements 71, the fourth switching elements 72, the first switching elements 73, and the second switching elements 74 to electrically connect the source terminals 61, the touch detection terminals 62, and the selection terminals 63 to the source driver circuit 53 and the touch detection circuit 54.

For example, as shown in Table 6, the voltages applied to the three setting terminals 65A, 65B, and 65C may correspond to the register values shown in Table 1. The drive voltage of the touch panel display driver 51' can be used as the high-level voltage, and the ground voltage can be used as the low-level voltage.

TABLE 6

| Voltage combination of setting terminal | | | |
|---|---|---|---|
| Setting terminal 65A | Setting terminal 65B | Setting terminal 65C | Register value |
| L | L | L | 0 |
| L | L | H | 1 |
| L | H | L | 2 |
| L | H | H | 3 |
| H | L | L | 4 |
| H | L | H | 5 |
| H | H | L | 6 |
| H | H | H | 7 |

Similarly to the first embodiment, the touch panel display driver 51' can correspond to the in-cell touch panels corresponding to various image resolutions and touch resolutions, and can drive the in-cell touch panel with a smaller number of touch panel display drivers. In addition, the source terminals 61, the touch detection terminals 62, and the selection terminals 63 are electrically connected to the source driver circuit 53 and the touch detection circuit 54 while the display panel on which the touch panel display driver 51' is mounted is operated, and thus the operation of the display panel including the touch panel display driver 51' can be checked without operating the host computer, for example.

OTHER EMBODIMENTS

The touch panel display driver and the display module of the disclosure are not limited to the above-described embodiments, and various modifications are possible. For example, the number of source terminals, touch detection terminals, and selection terminals, register values that can be set, the numbers and positions of the selection terminals connected to the source driver circuit and the numbers and positions of the selection terminals connected to the touch detection circuit 54 depending on the register values, the circuit configuration of the touch panel display driver, and the like are merely examples, and are not limited to the configurations illustrated in the above-described embodiments. In addition, as described above, the configuration of the display device and the configuration of the touch panel are not limited to the above-described embodiments. The touch panel display driver of the disclosure may be adapted to liquid crystal display devices, organic EL display devices, and touch panels of various structures and driving methods.

Further, the touch panel display driver and the display module of the disclosure can be also described as follows.

The touch panel display driver according to a first configuration includes the source driver circuit, the touch detection circuit, the selector circuit, the plurality of source terminals, the plurality of touch detection terminals, and the plurality of selection terminals. The selector circuit includes the plurality of first switching elements, the plurality of second switching elements, and the register, electrically connects the source driver circuit to each of the source terminals, and electrically connects the touch detection circuit to each of the touch detection terminals. In the selector circuit, each of the plurality of first switching elements and a respective one of the plurality of second switching elements constitute a pair, and in each pair, one end of the first switching element and one end of the second switching element are electrically connected to the same one of the plurality of selection terminals, with the other end of the first switching element being electrically connected to the source driver circuit and the other end of the second switching element being electrically connected to the touch detection circuit, and the selector circuit selectively turns on one from among the first switching element and the second switching element in each of the plurality of pairs at a time of operation based on setting data of a register set by a signal received from outside.

According to the first configuration, the number of source wiring lines that can be driven and the number of touch detection wiring lines that can be detected by one touch panel display driver can be changed. Thus, the first configuration can be adapted to the in-cell touch panels corresponding to various image resolutions and touch resolutions. Further, the in-cell touch panel type display panel can be driven by a smaller number of touch panel display drivers.

In a second configuration according to the first configuration, the selector circuit may further include a plurality of third switching elements and a plurality of fourth switching elements, each of the plurality of third switching elements may be inserted between the source driver circuit and a respective one of the plurality of source terminals, each of the plurality of fourth switching elements may be inserted between the touch detection circuit and a respective one of the plurality of touch detection terminals, and the selector circuit may turn on the plurality of third switching elements and the plurality of fourth switching elements at the time of operation. According to the second configuration, a switching element is disposed between all of the source terminals, touch detection terminals, and selection terminals and the source driver circuit or touch detection circuit, and thus a difference in applied voltage level of the image data between the source terminal and the selection terminal connected to the source driver circuit and a difference in detection sensitivity between the touch detection terminal and the selection terminal connected to the touch detection circuit are suppressed.

A third configuration according to the first or second configuration may further include at least one setting terminal and a register setting circuit connected to the at least one setting terminal, and the register setting circuit may set the setting data into the register based on a voltage applied to the at least one setting terminal. According to the third configuration, the operation of the display panel including the touch panel display driver can be confirmed without operating the host computer.

In a fourth configuration according to any one of the first to third configurations, the setting data may include a plurality of setting values, and the numbers of the plurality of first switching elements to be turned on may be different from each other corresponding to each of the plurality of setting values.

In a fifth configuration according to any one of the first to fourth configurations, the setting data may include a plurality of setting values, and positions of the plurality of selection terminals each connected to a respective one of the plurality of first switching elements to be turned on may be different from each other corresponding to each of the plurality of setting values.

A display module according to a sixth configuration includes a display panel including a substrate including a first side, a plurality of pixels disposed in a matrix shape on the substrate and respectively including a switching element, a plurality of sensor electrodes disposed in a matrix shape on the substrate, the plurality of sensor electrodes being configured to detect touch, a plurality of source wiring lines each connected to a respective one switching element of the plurality of pixels on the substrate and including one end located at or near the first side, and a plurality of touch detection wiring lines each connected to a respective one of the plurality of sensor electrodes on the substrate and including one end located at or near the first side, and the touch panel display driver according to any one of the first to fifth configurations, wherein each of the plurality of source terminals is connected to one end of a respective one of the plurality of source wiring lines, each of the plurality of the touch detection terminals is connected to one end of a respective one of the plurality of the touch detection wiring lines, some of the plurality of selection terminals are each connected to one end of some of respective ones of the plurality of source wiring lines, and at least some of the rest of the plurality of selection terminals are each connected to one end of some of respective ones of the plurality of the touch detection wiring lines.

According to the sixth configuration, the in-cell touch panel type display panel can be driven by a smaller number of touch panel display drivers.

In a seventh configuration according to the sixth configuration, the display panel may be a liquid crystal display panel.

In an eighth configuration according to the sixth configuration, the display panel may be an organic EL panel.

INDUSTRIAL APPLICABILITY

A touch panel display driver and a display module according to the disclosure are suitably used for a display module with a built-in touch panel of a combination of various image resolutions and touch detection resolutions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A touch panel display driver comprising:
   a source driver circuit;
   a touch detection circuit;
   a selector circuit;
   a register;
   a plurality of source terminals;
   a plurality of touch detection terminals; and
   a plurality of selection terminals,
   wherein the selector circuit includes a plurality of first switching elements and a plurality of second switching elements, electrically connects the source driver circuit to each of the plurality of source terminals, and electrically connects the touch detection circuit to each of the plurality of touch detection terminals,
   in the selector circuit, each of the plurality of first switching elements and a respective one of the plurality of second switching elements constitute a pair, and in each pair, one end of the first switching element and one end of the second switching element are electrically connected to a same one of the plurality of selection terminals, an other end of the first switching element is electrically connected to the source driver circuit, and an other end of the second switching element is electrically connected to the touch detection circuit, and
   the selector circuit is configured to selectively turn on one from among the first switching element and the second switching element in each of the plurality of pairs at a time of operation based on setting data of a register set by a signal received from outside.

2. The touch panel display driver according to claim 1, wherein the selector circuit further includes a plurality of third switching elements and a plurality of fourth switching elements,
   each of the plurality of third switching elements is inserted between the source driver circuit and a respective one of the plurality of source terminals,
   each of the plurality of fourth switching elements is inserted between the touch detection circuit and a respective one of the plurality of touch detection terminals, and
   the selector circuit turns on the plurality of third switching elements and the plurality of fourth switching elements at the time of operation.

3. The touch panel display driver according to claim 1, further comprising:
   at least one setting terminal; and
   a register setting circuit connected to the at least one setting terminal,
   wherein the register setting circuit sets the setting data into the register based on a voltage applied to the at least one setting terminal.

4. The touch panel display driver according to claim 1, wherein the setting data includes a plurality of setting values, and
   the numbers of the plurality of first switching elements to be turned on are different from each other corresponding to each of the plurality of setting values.

5. The touch panel display driver according to claim 1, wherein the setting data includes a plurality of setting values, and
   positions of the plurality of selection terminals each connected to a respective one of the plurality of first switching elements to be turned on are different from each other corresponding to each of the plurality of setting values.

6. A display module comprising:
   a display panel including
   a substrate including a first side,
   a plurality of pixels disposed in a matrix shape on the substrate and respectively including a switching element,
   a plurality of sensor electrodes disposed in a matrix shape on the substrate, the plurality of sensor electrodes being configured to detect touch,
   a plurality of source wiring lines each connected to a respective one switching element of the plurality of pixels on the substrate and including one end located at or near the first side, and
   a plurality of touch detection wiring lines each connected to a respective one of the plurality of sensor electrodes on the substrate and including one end located at or near the first side, and
   the touch panel display driver according to claim 1,
   wherein each of the plurality of source terminals is connected to one end of a respective one of the plurality of source wiring lines,
   each of the plurality of the touch detection terminals is connected to one end of a respective one of the plurality of the touch detection wiring lines, some of the plurality of selection terminals are each connected to one end of some of respective ones of the plurality of source wiring lines, and at least some of the rest of the plurality of selection terminals are each connected to one end of some of respective ones of the plurality of the touch detection wiring lines.

7. The display module according to claim 6, wherein the display panel is a liquid crystal display panel.

8. The display module according to claim 6, wherein the display panel is an organic EL panel.

* * * * *